US009599360B2

(12) United States Patent
Kim et al.

(10) Patent No.: US 9,599,360 B2
(45) Date of Patent: Mar. 21, 2017

(54) COMMUNICATION MODULE, MULTI-TYPE AIR CONDITIONING APPARATUS USING THE SAME, AND CONTROL METHOD THEREOF

(71) Applicant: SAMSUNG ELECTRONICS CO., LTD., Suwon-si, Gyeonggi-do (KR)

(72) Inventors: Eun Joo Kim, Seoul (KR); Yong Gak Kim, Gwangmyeong-si (KR); Hee Il Park, Incheon (KR); Dong Kue Lee, Pyeongtak-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 506 days.

(21) Appl. No.: 14/166,265

(22) Filed: Jan. 28, 2014

(65) Prior Publication Data

US 2014/0214216 A1 Jul. 31, 2014

(30) Foreign Application Priority Data

Jan. 29, 2013 (KR) .................... 10-2013-0009676

(51) Int. Cl.
*F24F 11/00* (2006.01)
*F24F 3/06* (2006.01)
*H04L 12/403* (2006.01)

(52) U.S. Cl.
CPC .......... *F24F 11/0086* (2013.01); *F24F 3/065* (2013.01); *F24F 11/006* (2013.01); *H04L 12/403* (2013.01); *F24F 2011/0067* (2013.01)

(58) Field of Classification Search
None
See application file for complete search history.

(56) References Cited

U.S. PATENT DOCUMENTS 6,026,652 A * 2/2000 Wada ................. F24F 11/006
 236/51
2004/0255601 A1* 12/2004 Kwon ............... F24F 11/0086
 62/157
(Continued)

FOREIGN PATENT DOCUMENTS

EP 2 333 443 A2 11/2010
KR 10-2006-0100180 9/2006
(Continued)

OTHER PUBLICATIONS

Extended European Search Report issued Jun. 27, 2014 in corresponding European Application No. 14152886.9.
(Continued)

*Primary Examiner* — Isaac T Tecklu
(74) *Attorney, Agent, or Firm* — Staas & Halsey LLP

(57) ABSTRACT

A multi-type air conditioning apparatus including an outdoor unit, indoor units, and a communication line, each of the outdoor unit and the indoor units including a communicator transmitting/receiving data through the communication line and a controller transmitting at least one preamble signal, including priority information to transmit the data using the communication line, through the communication line, and transmitting the data through the communication line when transmission of the at least one preamble signal has been completed. In the multi-type air conditioning apparatus, each of the outdoor unit and the indoor units selects a priority set time, transmits a preamble signal after the selected priority set time has elapsed, and delays data transmission when a preamble signal transmitted by another constituent unit is sensed during the priority set time, thus avoiding collision on the communication line and rapidly occupying the communication line.

26 Claims, 10 Drawing Sheets

(56) References Cited

U.S. PATENT DOCUMENTS

| | | | | |
|---|---|---|---|---|
| 2008/0161973 A1* | 7/2008 | Sakae | .................. | F24F 11/0086 |
| | | | | 700/276 |
| 2009/0139251 A1* | 6/2009 | Masui | .................. | F24F 11/0009 |
| | | | | 62/129 |
| 2009/0281666 A1* | 11/2009 | Saruwatari | ........... | F24F 11/0009 |
| | | | | 700/275 |
| 2011/0120694 A1* | 5/2011 | Jo | .......................... | F24F 11/006 |
| | | | | 165/237 |
| 2011/0224833 A1* | 9/2011 | Kim | ...................... | F24F 11/006 |
| | | | | 700/276 |
| 2011/0252818 A1* | 10/2011 | Kinoshita | ............. | F25B 49/025 |
| | | | | 62/115 |

FOREIGN PATENT DOCUMENTS

| KR | 10-2011-0101367 | 9/2011 |
|---|---|---|
| KR | 10-2011-0101371 | 9/2011 |

OTHER PUBLICATIONS

International Search Report issued May 12, 2014 in corresponding Application PCT/KR2014/000794.

* cited by examiner (a)

COMMUNICATION REQUIRED (b)

COMMUNICATION REQUIRED

COMMUNICATION MODULE, MULTI-TYPE AIR CONDITIONING APPARATUS USING THE SAME, AND CONTROL METHOD THEREOF

CROSS-REFERENCE TO RELATED APPLICATIONS

This application claims the benefit of Korean Patent Application No. 10-2013-0009676, filed on Jan. 29, 2013 in the Korean Intellectual Property Office, the disclosure of which is incorporated herein by reference.

BACKGROUND

1. Field

One or more embodiments relate to a communication module which sets priority in data transmission by transmitting a preamble signal, and a multi-type air conditioning apparatus using the same, and a control method thereof.

2. Description of the Related Art

A conventional multi-type air conditioning apparatus including a plurality of outdoor units and a plurality of indoor units in an RS-485 communication environment uses a polling method to avoid collision on a communication line.

That is, after one constituent unit of the plural outdoor units and the plural indoor units is set as a master unit and the remaining constituent units are set as slave units, the master unit authorizes the slave units to perform communication in order. That is, each of the slave unit may transmit data only when it is the corresponding slave unit's turn.

Since the master unit authorizes all the slave units to perform communication once, when the number of the slave units increases, the slave units stand by for a long time to occupy the communication line and to perform communication.

SUMMARY

Therefore, the foregoing described problems may be overcome and/or other aspects may be achieved by one or more embodiments of a multi-type air conditioning apparatus and a communication module in which each of constituent units, i.e., of a plurality of outdoor units and a plurality of indoor units, sets communication priority by itself so as to avoid collision on a communication line.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

In accordance with one or more embodiments, in a multi-type air conditioning apparatus that may include at least one outdoor unit, a plurality of indoor units, and a communication line connecting the at least one outdoor unit and the plurality of indoor units, each of the at least one outdoor unit and the plurality of indoor units may include a communicator transmitting/receiving data through the communication line and a controller that may transmit through the communication line at least one preamble signal that may include priority information to transmit the data using the communication line, and may transmit the data through the communication line when transmission of the at least one preamble signal has been completed.

The controller may randomly select a priority set time so as to transmit the at least one preamble signal, and may transmit the at least one preamble signal when the priority set time has elapsed.

The controller may stop transmission of the at least one preamble signal when a preamble signal transmitted from another constituent unit of the multi-type air conditioning apparatus is sensed through the communication line before transmission of the at least one preamble signal has been completed.

The at least one preamble signal may include at least two pulses.

The controller may determine whether or not the communication line is occupied by the other constituent unit.

The controller may stand by during a communication request standby time so as to determine whether or not the communication line is occupied.

The controller may sense the preamble signal transmitted from the other constituent unit during the communication request standby time, and may determine that the communication line is occupied by the other constituent unit when the preamble signal transmitted from the other constituent unit is sensed.

The controller may receive the preamble signal transmitted from the other constituent unit as an external interrupt.

The controller may stand by until data transmission of the other constituent unit has been completed, upon determining that the communication line is occupied by the other constituent unit.

The communicator may transmit/receive the data in a differential communication mode.

The communicator may transmit/receive the data based on a Recommended Standard (RS)-485 communication regulation.

In accordance with one or more embodiments, in a communication module that may include a plurality of constituent units and a communication line connecting the plurality constituent units, each of the plurality of constituent units may include a communicator that may transmit/receive data through the communication line and a controller that may transmit through the communication line at least one preamble signal that may include priority information to transmit the data using the communication line, and that may transmit the data through the communication line when transmission of the at least one preamble signal has been completed.

The controller may randomly select a priority set time so as to transmit the at least one preamble signal, and may transmit the at least one preamble signal when the priority set time has elapsed.

The controller may stop transmission of the at least one preamble signal when a preamble signal transmitted from another constituent unit of the communication module is sensed through the communication line before transmission of the at least one preamble signal has been completed.

The at least one preamble signal may include at least two pulses.

In accordance with one or more embodiments, a control method of a multi-type air conditioning apparatus which has at least one outdoor unit, a plurality of indoor units, and a communication line connecting the at least one outdoor unit and the plurality of indoor units, may include transmitting through the communication line at least one preamble signal that may include priority information to transmit data using the communication line, and transmitting the data through the communication line, when transmission of the at least one preamble signal has been completed.

The transmission of the at least one preamble signal may include randomly selecting a priority set time so as to transmit the at least one preamble signal, and transmitting the at least one preamble signal when the priority set time has elapsed.

The control method may further include stopping transmission of the at least one preamble signal when a preamble signal transmitted from another constituent unit of the multi-type air conditioning apparatus is sensed through the communication line before transmission of the at least one preamble signal has been completed.

The at least one preamble signal may include at least two pulses.

The control method may further include determining whether or not the communication line is occupied by the other constituent unit.

The determination as to whether or not the communication line is occupied may include sensing the preamble signal transmitted from the other constituent unit, and determining that the communication line is occupied by the other constituent unit when the preamble signal transmitted from the other constituent unit is sensed.

The control method may further include standing by until data transmission of the other constituent unit has been completed, upon judging that the communication line is occupied by the other constituent unit.

The data may be transmitted/received in a differential communication mode.

The data may be transmitted/received based on a Recommended Standard (RS)-485 communication regulation.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
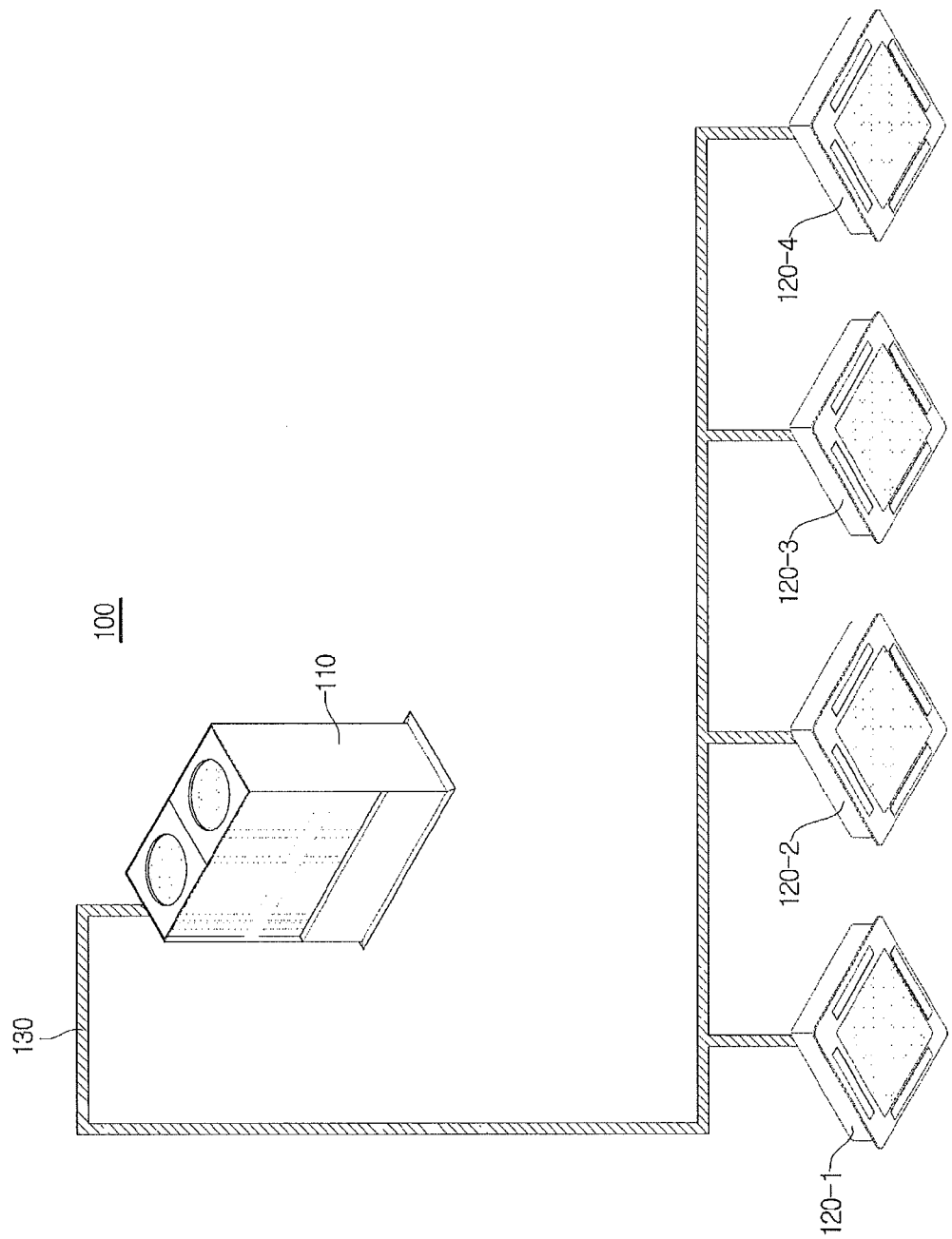
FIG. 1 is a view illustrating the configuration of a multi-type air conditioning apparatus in accordance with one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

Hereinafter, application of a communication device in accordance with one or more embodiments to a multi-type air conditioning apparatus will be exemplarily described. However, embodiments are not limited thereto and may be applied to any case in which a plurality of units uses a single communication line.

Figure 2:
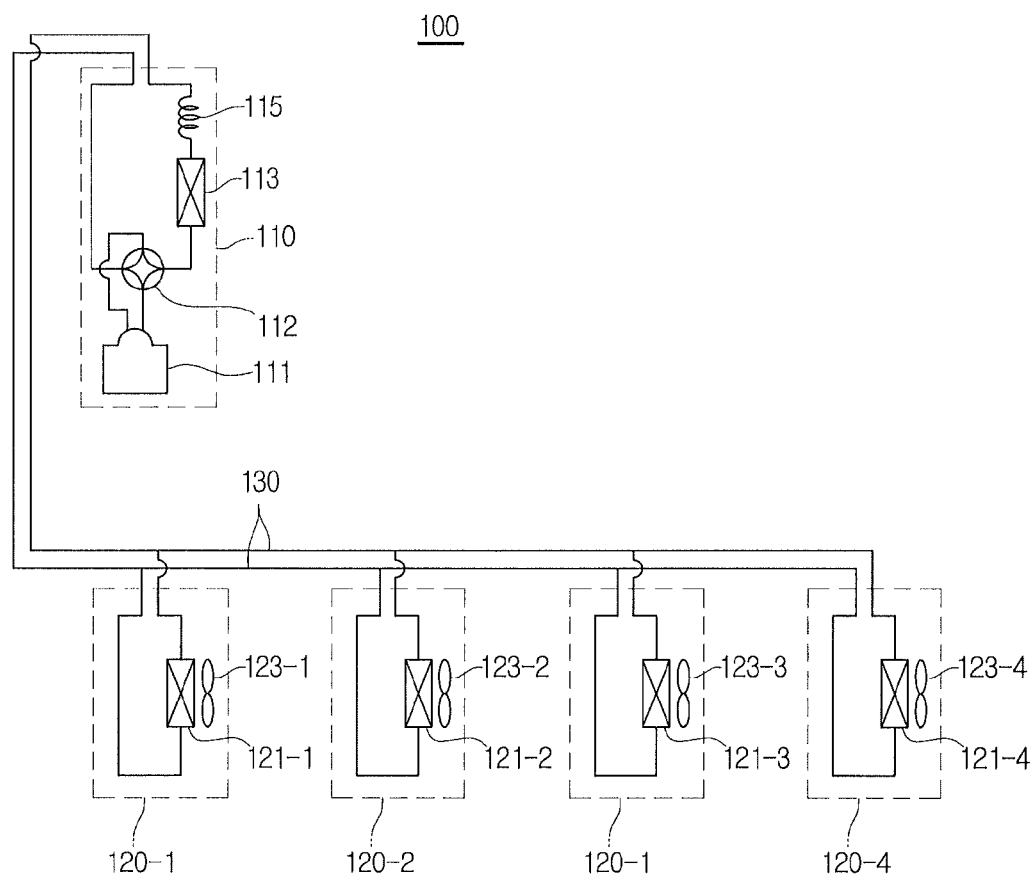
FIG. 2 is a view illustrating the detailed configurations of constituent units of the multi-type air conditioning apparatus in accordance with one or more embodiments.

FIG. 1 is a view illustrating the configuration of a multi-type air conditioning apparatus 100 in accordance with one or more embodiments, and FIG. 2 is a view illustrating the detailed configurations of constituent units of the multi-type air conditioning apparatus 100 in accordance with one or more embodiments.

With reference to FIG. 1, the multi-type air conditioning apparatus 100 may include an outdoor unit 110 performing heat exchange between outdoor air and a refrigerant, a plurality of indoor units, for example, a first indoor unit 120-1, a second indoor unit 120-2, a third indoor unit 120-3, and a fourth indoor unit 120-4, performing heat exchange between indoor air and the refrigerant, and refrigerant passages 130 serving as paths of the refrigerant between the outdoor unit 110 and the indoor units 120-1, 120-2, 120-3, and 120-4.

The outdoor unit 110 may be provided at the outside of a space desired to be air conditioned, i.e., outdoors, and may include a compressor 111 to compress the refrigerant to circulate the refrigerant along the refrigerant passages 130, an outdoor heat exchanger 113 to exchange heat between outdoor air and the refrigerant, an expander 115 to decompress the refrigerant in a gaseous state, and a 4-way valve 112 to control a refrigerant flow according to operating modes of the multi-type air conditioning apparatus 100.

The first indoor unit 120-1 may be provided at the inside of a space desired to be air conditioned, i.e., indoors, and may include a first indoor heat exchanger 121-1 to exchange heat between indoor air and the refrigerant and a first indoor fan 123-1 to discharge air having exchanged heat in the first indoor heat exchanger 121-1 to the air conditioned space.

The second indoor unit 120-2 may include a second indoor heat exchanger 121-2 and a second indoor fan 123-2, the third indoor unit 120-3 may include a third indoor heat exchanger 121-3 and a third indoor fan 123-3, and the fourth indoor unit 120-4 may include a fourth indoor heat exchanger 121-4 and a fourth indoor fan 123-4. The second heat exchanger 121-2, the third heat exchanger 121-3, and the fourth heat exchanger 121-4 may have the same configuration and function as those of the first heat exchanger 121-1, and the second fan 123-2, the third fan 123-3, and the fourth fan 123-4 may have the same configuration and function as those of the first fan 123-1.

Hereinafter, operation of the multi-type air conditioning apparatus 100 will be described.

If the multi-type air conditioning apparatus 100 is in a cooling mode, a central control unit 140 of the multi-type air conditioning apparatus 100 may drive the compressor 111 to compress the refrigerant, and may control the 4-way valve 112 to provide the compressed refrigerant to the outdoor heat exchanger 113.

Thereby, the refrigerant compressed by the compressor 111 may be provided to the heat exchanger 113, and may be condensed by the heat exchanger 113 so as to possibly discharge thermal energy outdoors. Thereafter, the condensed refrigerant may be provided to the expander 115, and may be decompressed by the expander 115. The decompressed refrigerant may be provided to the first indoor heat exchanger 121-1, the second indoor heat exchanger 121-2, the third indoor heat exchanger 121-3, or the fourth indoor heat exchanger 121-4, and may be evaporated by the first indoor heat exchanger 121-1, the second indoor heat exchanger 121-2, the third indoor heat exchanger 121-3, or the fourth indoor heat exchanger 121-4 so as to possibly absorb thermal energy from indoor air. The evaporated refrigerant may be provided again to the compressor 111, and may be compressed by the compressor 111.

In the cooling mode, as the refrigerant may be evaporated by the first indoor unit 120-1, the second indoor unit 120-2, the third indoor unit 120-3, or the fourth indoor unit 120-4 so as to possibly absorb thermal energy from indoor air, the multi-type air conditioning apparatus 100 may cool the indoor air.

If the multi-type air conditioning apparatus 100 is in a heating mode, the central control unit 140 of the multi-type air conditioning apparatus 100 may drive the compressor 111 to compress the refrigerant, and may control the 4-way valve 112 to provide the compressed refrigerant to the first indoor heat exchanger 121-1, the second indoor heat exchanger 121-2, the third indoor heat exchanger 121-3, or the fourth indoor heat exchanger 121-4. Thereby, the refrigerant compressed by the compressor 111 may be provided to the first indoor heat exchanger 121-1, the second indoor heat exchanger 121-2, the third indoor heat exchanger 121-3, or the fourth indoor heat exchanger 121-4, and may be condensed by the first indoor heat exchanger 121-1, the second indoor heat exchanger 121-2, the third indoor heat exchanger 121-3, or the fourth indoor heat exchanger 121-4 so as to possibly discharge thermal energy indoors. Thereafter, the condensed refrigerant may be provided to the expander 115 of the outdoor unit 110, and may be decompressed by the expander 115. The decompressed refrigerant may be provided to the outdoor heat exchanger 113, and may be evaporated by the outdoor heat exchanger 113 so as to possibly absorb thermal energy from outdoor air. The evaporated refrigerant may be provided again to the compressor 111, and may be compressed by the compressor 111.

In the heating mode, as the refrigerant is condensed by the first indoor unit 120-1, the second indoor unit 120-2, the third indoor unit 120-3, or the fourth indoor unit 120-4 so as to discharge thermal energy to indoor air, the multi-type air conditioning apparatus 100 may heat the indoor air.

Figure 3:
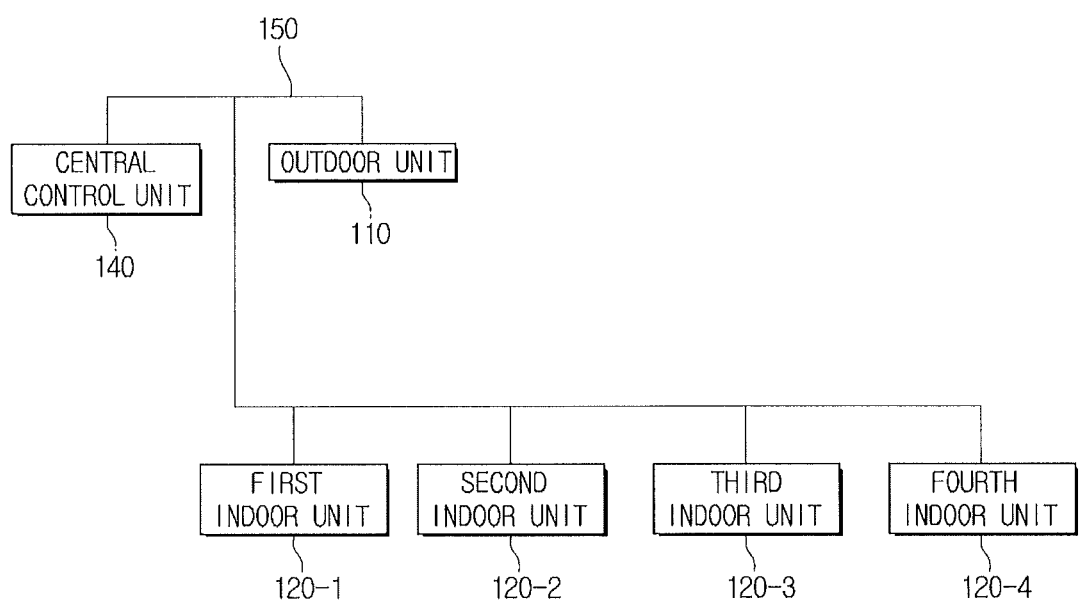
FIG. 3 is a block diagram illustrating a control flow of the multi-type air conditioning apparatus in accordance with one or more embodiments.
Figure 4:
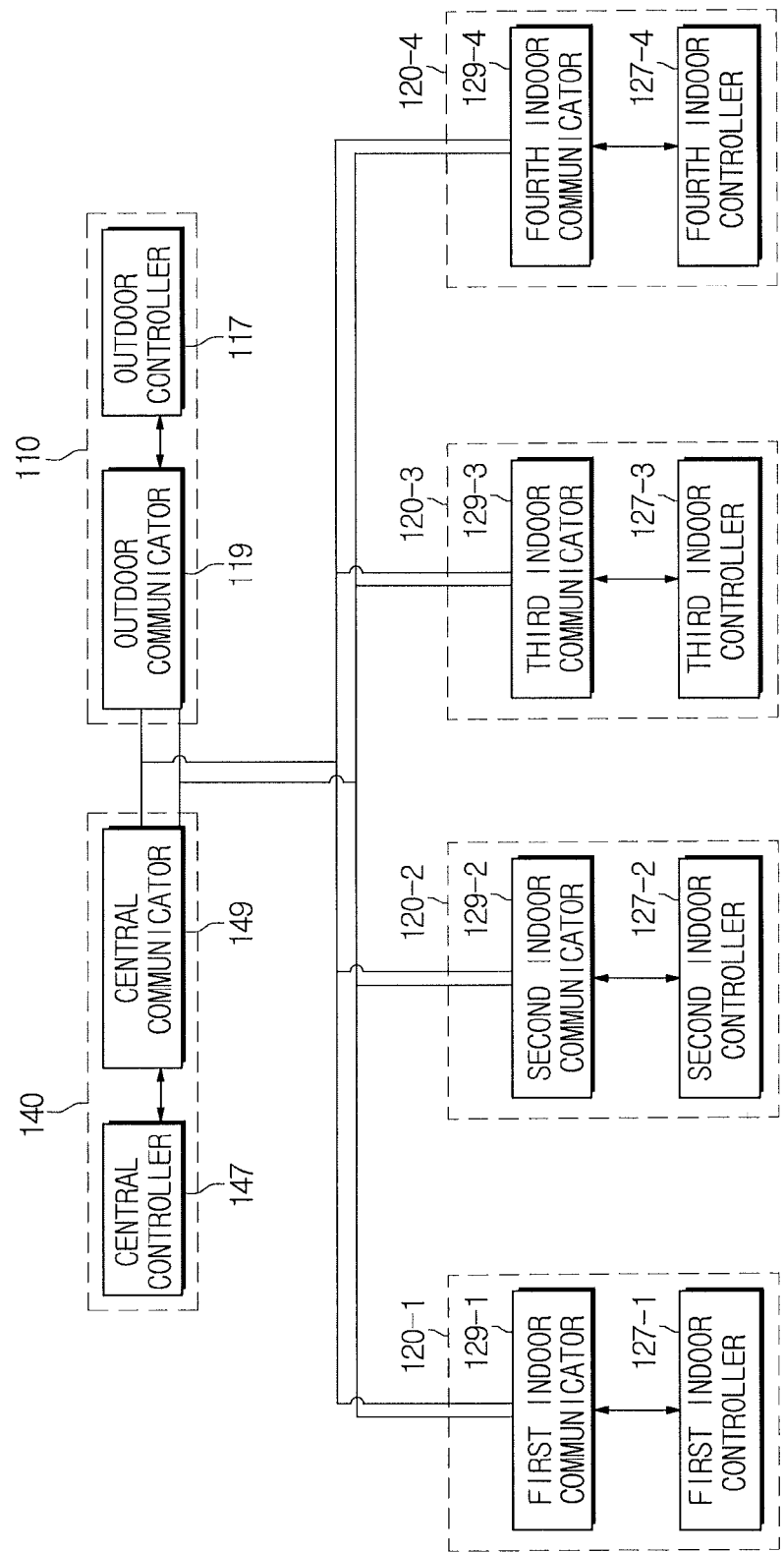
FIG. 4 is a block diagram illustrating a detailed control flow among the constituent units of the multi-type air conditioning apparatus in accordance with one or more embodiments.

FIG. 3 is a block diagram illustrating a control flow of the multi-type air conditioning apparatus 100 in accordance with one or more embodiments, and FIG. 4 is a block diagram illustrating a detailed control flow among the constituent units of the multi-type air conditioning apparatus 100 in accordance with one or more embodiments.

With reference to FIGS. 3 and 4, the multi-type air conditioning apparatus 100 may include the outdoor unit 110 to exchange heat between outdoor air and the refrigerant, the first indoor unit 120-1, the second indoor unit 120-2, the third indoor unit 120-3, and the fourth indoor unit 120-4 to exchange heat between indoor unit and the refrigerant, the central control unit 140 to control the overall operation of the multi-type air conditioning apparatus 100, and a communication line 150.

Hereinafter, for convenience of description, the central control unit 140, the outdoor unit 110, the first indoor unit 120-1, the second indoor unit 120-2, the third indoor unit 120-3, and the fourth indoor unit 120-4 will be referred to as constituent units.

The outdoor unit 110 may include an outdoor controller 117 to control the overall operation of the outdoor unit 110 and an outdoor communicator 119 to communicate with other constituent units than the central control unit 140 and the outdoor unit 110, and the first, second, third, and fourth indoor units 120-1, 120-2, 120-3, and 120-4 may include first, second, third, and fourth indoor controllers 127-1, 127-2, 127-3, and 127-4 to control the overall operation of the respective indoor units and first, second, third, and fourth indoor communicators 129-1, 129-2, 129-3, and 129-4 to communicate with the central control unit 140 and the outdoor unit 110.

The central control unit 140 may include a central controller 147 to generate a control signal to drive the compressor 111 and to control the 4-way valve 112 of the outdoor unit 110 according to a heating or cooling request from the first indoor unit 120-1, the second indoor unit 120-2, the third indoor unit 120-3, or the fourth indoor unit 120-4, and a central communicator 149 to communicate with the outdoor unit 110, the first indoor unit 120-1, the second indoor unit 120-2, the third indoor unit 120-3, and the fourth indoor unit 120-4 through the communication line 150.

Now, operation of the central control unit 140 will be exemplarily described. If heating of a first air conditioned space in which the first indoor unit 120-1 may be provided is required, the first indoor unit 120-1 may transmit a heating operation request to the central control unit 140, and the central control unit 140 having received the heating operation request may transmit the fact of receiving the heating operation request to the first indoor unit 120-1 and may transmit a control signal to drive the compressor 211 and control the 4-way valve 112 in the heating mode to the outdoor unit 110. The outdoor unit 110 having received the control signal of the central control unit 140 may transmit the fact of receiving the control signal to the central control unit 140.

The communication line 150 may be provided so as to perform communication among the central control unit 140, the outdoor unit 110, the first indoor unit 120-1, the second indoor unit 120-2, the third indoor unit 120-3, and the fourth indoor unit 120-4. The configuration of the communication line 150 may be varied according to communication environment.

For example, in a Recommended Standard (RS)-232 communication environment operated in a single-ended mode in which data transmission and reception are carried out through separate lines, a transmission line (Tx), a reception line (Rx), and a ground line (GND) may be required and, in an RS-485 communication environment operated in a differential mode in which data transmission and reception are carried out through a single line, a positive (+) communication line 150 and a negative (−) communication line 150 may be required.

Hereinafter, it is assumed that the multi-type air conditioning apparatus 100 in accordance with one or more embodiments is operated in the RS-485 communication environment.

As exemplarily shown in FIG. 4, the central control unit 140, the outdoor unit 110, the first indoor unit 120-1, the second indoor unit 120-2, the third indoor unit 120-3, and the fourth indoor unit 120-4 may be connected through the single communication line 150. Therefore, if two or more constituent units desire to transmit data, competition among the constituent units may occur. For example, if heating of a second air conditioned space in which the second indoor unit 120-2 may be provided as well as the first air conditioned space in which the first indoor unit 120-1 may be provided is required, the first indoor unit 120-1 and the second indoor unit 120-2 may compete for the single communication line 150.

If competition among two or more constituent units for the communication line 150 occurs, priority may be set and the two or more constituent units may sequentially occupy the communication line 150 according to the set priority.

Hereinafter, a method of avoiding collision among two or more constituent units due to competition among the two or more constituent units for the communication line 150 will be described.

Figure 5:
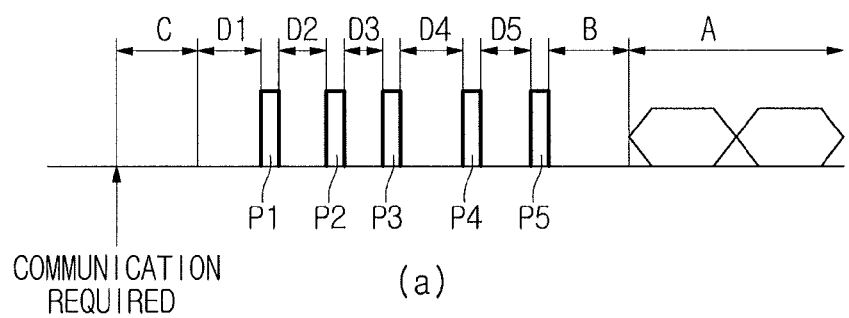
FIG. 5 is a view illustrating a communication method among the constituent units of the multi-type air conditioning apparatus in accordance with one or more embodiments.
Figure 5:
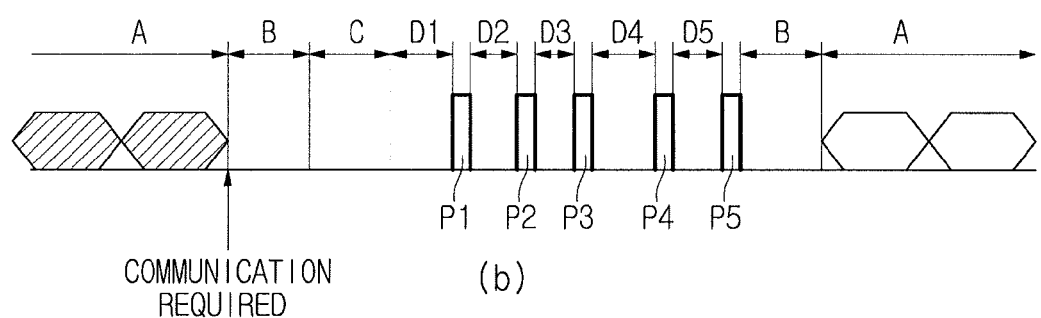
Figure 6:
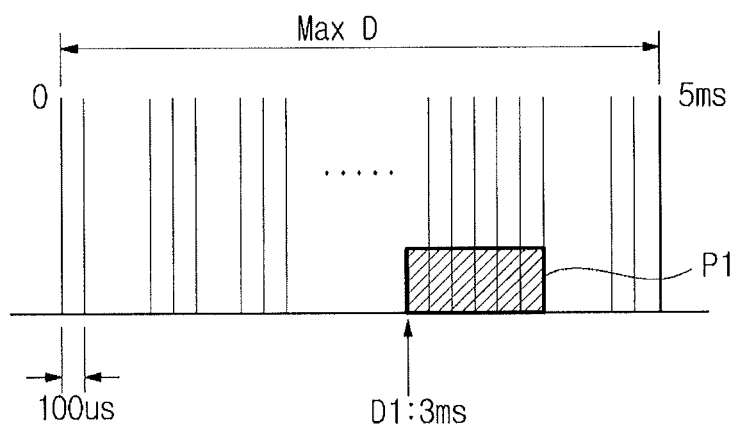
FIG. 6 is a view illustrating a preamble signal generated by the constituent unit of the multi-type air conditioning apparatus in accordance with one or more embodiments.

FIGS. 5(a) and 5(b) are views illustrating a communication method among the constituent units of the multi-type air conditioning apparatus 100 in accordance with one or more embodiments, and FIG. 6 is a view illustrating a preamble signal generated by the constituent unit of the multi-type air conditioning apparatus 100 in accordance with one or more embodiments.

In more detail, FIG. 5(a) illustrates preamble signals transmitted by the constituent unit of the multi-type air conditioning apparatus 100 if the communication line 150 is not occupied, and FIG. 5(b) illustrates preamble signals transmitted by the constituent unit of the multi-type air conditioning apparatus 100 if the communication line 150 is occupied.

Hereinafter, the case in which the first indoor unit 120-1 requests heating operation from the central control unit 140 will be exemplarily described. However, embodiments are not limited thereto and, if a constituent unit of the multi-type air conditioning apparatus 100 requests communication with another constituent unit, preamble signals shown in FIGS. 5(a) and 5(b) may be transmitted through the communication line 150.

The case in which the communication line 150 is not occupied in advance will be described with reference to FIG. 5(a). If communication through the communication line 150 is required, the first indoor unit 120-1 may stand by during a communication request standby time C. The reason for this is to check whether or not the communication line 150 is occupied by another constituent unit, such as the central control unit 140. The communication request standby time C may be variously set by a designer of the multi-type air conditioning apparatus 100, and, for example, may be set to 6 ms in the RS-485 communication environment.

When no signal is detected through the communication line 150 during the communication request standby time C, the first indoor unit 120-1 may select a first priority set time D1 to occupy the communication line 150, may generate a first preamble signal P1, and may transmit the first preamble signal P1 through the communication line 150.

Specifically, the first indoor unit 120-1 may randomly select the first priority set time D1, may sense a preamble signal transmitted by another constituent unit during the selected first priority set time D1, and may transmit the first preamble signal P1 through the communication line 150 if a preamble signal transmitted by another constituent unit is not sensed during the first priority set time D1.

Here, the first indoor unit 120-1 may select the first priority set time D1 so that the selected first priority set time D1 may be less than the maximum priority set time Max D. For example, as exemplarily shown in FIG. 6, if the maximum priority set time Max D is, for example, set to 5 ms, the first indoor unit 120-1 may randomly select the first priority set time D1 to be within 5 ms, may stand by for 3 ms without signal transmission to the communication line 150 if 3 ms is selected as the first priority set time D1, and may transmit a preamble P1 signal to the communication line 150 when 3 ms has elapsed.

Further, the first indoor unit 120-1 may divide the maximum priority set time into a plurality of sections and may select a random section from among the plurality of sections. For example, as exemplarily shown in FIG. 6, if the maximum priority set time is 5 ms, the first indoor unit 120-1 may divide 5 ms into 50 sections, each of which is 100 μs, and randomly select one of 1 to 50, thus selecting the priority set time. That is, when 10 is selected, the priority set time may be 1 ms, and, when 30 is selected, the priority set time may be 3 ms.

When the first preamble signal P1 is transmitted through the communication line 150, the first indoor unit 120-1 may select a second priority set time D2 and may generate a second preamble signal P2. Specifically, the first indoor unit 120-1 may randomly select the second priority set time D2 within the maximum priority set time Max D and may transmit a second preamble signal P2 when the selected second priority set time D2 has elapsed. That is to say, after transmission of the first preamble signal P1, the first indoor unit 120-1 may stand by during the second priority set time D2, and may transmit the second preamble signal P2 through the communication line 150 when the selected second priority set time D2 has elapsed.

The first indoor unit 120-1 may generate a third preamble signal P3, a fourth preamble signal P4, and a fifth preamble signal P5, and may transmit the third preamble signal P3, the fourth preamble signal P4, and the fifth preamble signal P5 through the communication line 150, in the same manner as the first preamble signal P1 and the second preamble signal P2, as shown in FIG. 5(a).

If a preamble signal transmitted by another constituent unit is not sensed before the first indoor unit 120-1 transmits the fifth preamble signal P5, the first indoor unit 120-1 may stand by during a data protection time B to protect data which will be transmitted and then may transmit data during a data transmission/reception time A.

In summary, in the operation of the first indoor unit 120-1 to occupy the communication line 150, the first indoor unit 120-1 may determine whether or not a preamble signal transmitted through the communication line 150 by another constituent unit is sensed during the communication request standby time C, may transmit the preamble signals P1, P2, P3, P4, and P5 between the priority set times D1, D2, D3, D4, and D5 through the communication line 150, and then may transmit data.

The case in which the communication line 150 is occupied in advance will be described with reference to FIG. 5(b). The first indoor unit 120-1 may stand by during the data transmission/reception time A when another constituent unit transmits data through the communication line 150 and the data protection time B to protect data.

When the data transmission/reception time A has elapsed, the first indoor unit 120-1 may stand by again during the communication request standby time C so as to determine whether or not the communication line 150 is occupied in advance. Whether or not the communication line 150 is occupied in advance may be determined according to whether or not a preamble signal transmitted by another constituent unit is sensed. Thereafter, the first indoor unit 120-1 may repeatedly perform selection of priority set times D1, D2, D3, D4, and D5 and transmission of preamble signals P1, P2, P3, P4, and P5, as described above.

If the communication line 150 has been occupied by a specific constituent unit and occupation of the communication line 150 has been terminated, as exemplarily shown in FIG. 5(b), plural constituent units (for example, the first indoor unit 120-1 and the second indoor unit 120-2) may compete to occupy the communication line 150. For example, if the central control unit 140 requests a version of a control program from the outdoor unit 110, the first indoor unit 120-1, the second indoor unit 120-2, the third indoor unit 120-3, and the fourth indoor unit 120-4 so as to upgrade the control program, the outdoor unit 110, the first indoor unit 120-1, the second indoor unit 120-2, the third indoor unit 120-3, and the fourth indoor unit 120-4 may desire to simultaneously respond to the request of the central control unit 140.

If the plural constituent units compete to occupy the communication line 150, as described above, setting of priority among the plural constituent units and occupation of the communication line 150 by the plural constituent units according to the set priority may be required.

Hereinafter, if the plural constituent units compete to occupy the communication line 150, as described above, a method of setting priority among the plural constituent units and allowing the plural constituent units to occupy the communication line 150 according to the set priority will be described.

Figure 7:
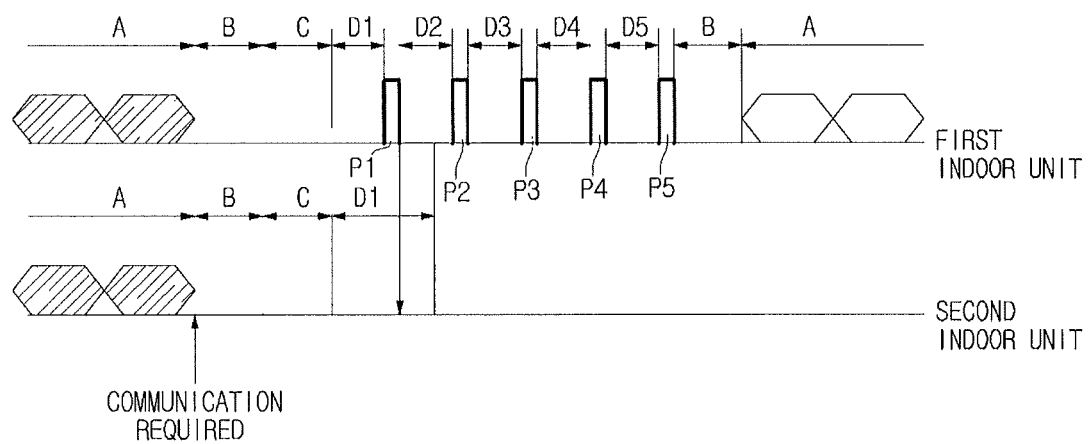
FIG. 7 is a view illustrating competition among the plural constituent units to occupy a communication line in the multi-type air conditioning apparatus in accordance with one or more embodiments.

FIG. 7 is a view illustrating competition among the plural constituent units to occupy the communication line 150 in the multi-type air conditioning apparatus 100 in accordance with one or more embodiments.

As exemplarily shown in FIG. 7, when the central control unit 140 requests data from the first indoor unit 120-1 and the second indoor unit 120-2 during the data transmission/reception time A, the first indoor unit 120-1 and the second indoor unit 120-2 may desire to occupy the communication line 150 so as to respond to the central control unit 140.

The first indoor unit 120-1 and the second indoor unit 120-2 having received the request from the central control unit 140 may stand by during the data protection time B so as to protect data transmitted by the central control unit 140 and may stand by during the communication request standby time C so as to determine whether or not the communication line 150 is occupied by another constituent unit.

Thereafter, the first indoor unit 120-1 and the second indoor unit 120-2 may select priority set times D1~D5, may generate preamble signals P1~P5 when the selected priority set times D1~D5 have elapsed, and may transmit the preamble signals P1~P5 through the communication line 150. When a preamble signal transmitted by another constituent unit is sensed during the communication request standby time C or the priority set times D1~D5, the first indoor unit 120-1 and the second indoor unit 120-2 may stand by again until the constituent unit having transmitted the corresponding preamble signal completes data transmission.

In accordance with the embodiment shown in FIG. 7, the first indoor unit 120-1 may select, for example, 3.5 ms as the first priority set time D1, and the second indoor unit 120-2 may select, for example, 4.5 ms as the first priority set time D1. Thereby, the first indoor unit 120-1 may stand by during the first priority set time D1 of 3.5 ms and then may transmit the first preamble signal P1 through the communication line 150, and the second indoor unit 120-2 may stand by during the first priority set time D1 of 4.5 ms and then may transmit the first preamble signal P1 through the communication line 150. Then, the second indoor unit 120-2 may sense the first preamble signal P1 transmitted by the first indoor unit 120-1 during the first priority set time D1.

The second indoor unit 120-2 having sensed the first preamble signal P1 transmitted by the first indoor unit 120-1 during the first priority set time D1 may stand by until the first indoor unit 120-1 completes data transmission.

Priority of the respective constituent units to occupy the communication line 150 may be determined by the randomly selected priority set times D1~D5. That is, a constituent unit which desires to occupy the communication line 150 may randomly select priority set times D1~D5, may stand by during the selected priority set times D1~D5, and then may transmit preamble signals P1~P5. At this time, when a preamble signal transmitted by another constituent unit is sensed during the priority set times D1~D5, the first constituent unit may stand by until data transmission by the latter constituent unit is completed.

According to such a manner, occupation probabilities of the communication line 150 by all constituent units of the multi-type air conditioning apparatus 100 are equal. However, as needed, there may be the case in which data needs to be urgently transmitted. For example, if the central control unit 140 inquires whether or not the outdoor unit 110, the first indoor unit 120-1, the second indoor unit 120-2, the third indoor unit 120-3, and the fourth indoor unit 120-4 malfunction and the outdoor unit 110 detects a malfunction, the outdoor unit 110 may need to preferentially respond to the central control unit 140 as compared with other constituent units, i.e., the first indoor unit 120-1, the second indoor unit 120-2, the third indoor unit 120-3, and the fourth indoor unit 120-4.

If such urgent communication is required, an urgent communication standby time shorter than the communication request standby time may be employed. For example, the communication request standby time may be set to 6 ms and the urgent communication standby time may be set to 3 ms. By setting the urgent communication standby time to 3 ms, a constituent unit requiring urgent communication may preferentially occupy the communication line 150 as compared with other constituent units, and then may perform communication.

Figure 8:
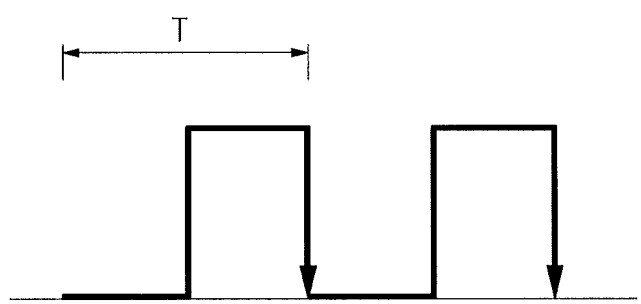
FIG. 8 is a view illustrating a preamble signal of the multi-type air conditioning apparatus in accordance with one or more embodiments.

FIG. 8 is a view illustrating a preamble signal of the multi-type air conditioning apparatus 100 in accordance with one or more embodiments.

As exemplarily shown in FIG. 8, a preamble signal may be implemented in the form of a pulse including at least two falling edges so as to be resistant to noise.

The RS-485 communication environment employed by the multi-type air conditioning apparatus 100 in accordance with one or more embodiments may be comparatively resistant to noise, but may cause an unexpected impulse or a pulse due to power. Particularly, the pulse due to power may be a main factor causing noise in the RS-485 communication environment.

In order to prevent misinterpretation of such an impulse or a pulse due to power as a preamble signal, the preamble signal may be implemented in the form of a pulse including at least two falling edges. Specifically, the preamble signal may include two square waves having a period T, and the period T of each square wave may be, for example, 200 µs. That is, for example, if two falling edges are detected at an interval of 200 µs, a constituent unit may identify a corresponding signal as a preamble signal. Further, in order to allow another constituent unit of the multi-type air conditioning apparatus 100 to identify a preamble signal, the period of each of two square waves may be more than, for example, 100 µs.

Figure 9:
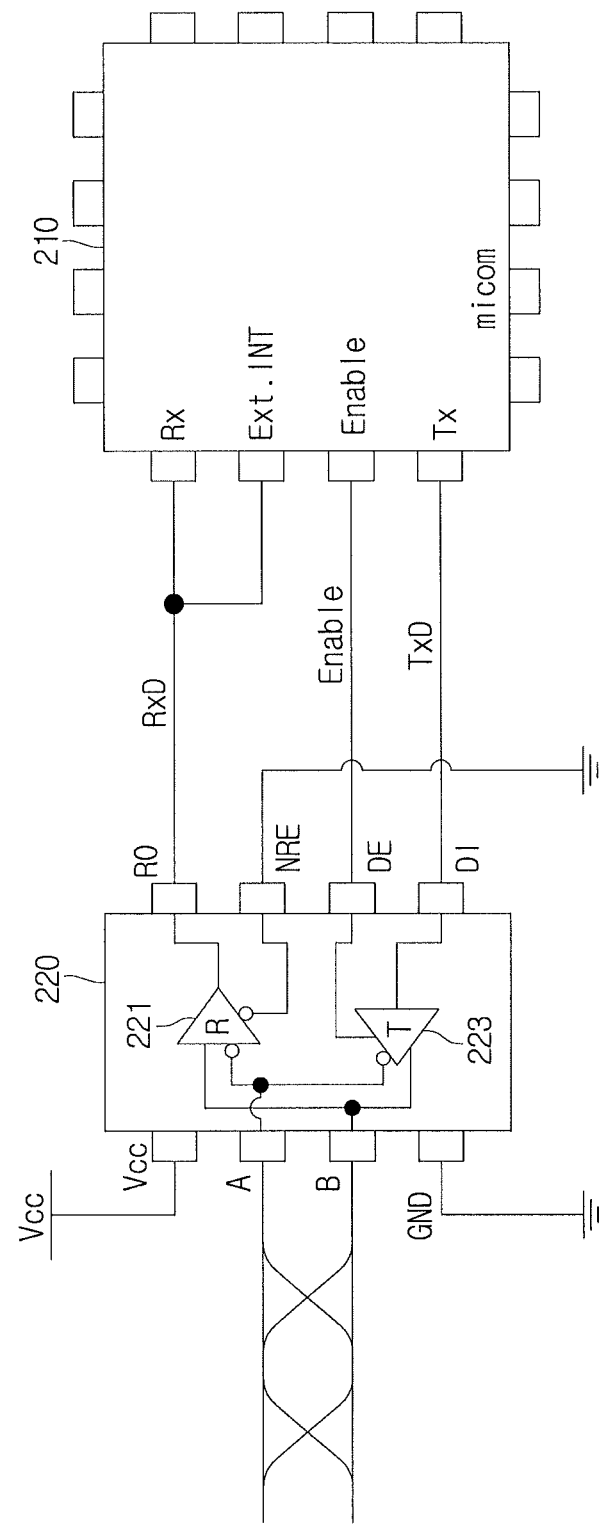
FIG. 9 is a view illustrating a communication circuit of the multi-type air conditioning apparatus in accordance with one or more embodiments.

FIG. 9 is a view illustrating a communication circuit of the multi-type air conditioning apparatus 100 in accordance with one or more embodiments.

Each of the constituent units (the central control unit 140, the outdoor unit 110, the first indoor unit 120-1, the second indoor unit 120-2, the third indoor unit 120-3, and the fourth indoor unit 120-4) of the multi-type air conditioning apparatus may include a microcomputer 210 to control each constituent unit and a communication device 220 to perform communication between the microcomputer 210 and the corresponding constituent unit.

The microcomputer 210 may correspond to the central controller 147, the outdoor controller 117, the first indoor controller 127-1, the second indoor controller 127-2, the third indoor controller 127-3, or the fourth indoor controller 127-4 shown in FIG. 4, and may include an Rx terminal to receive data from the outside, a Tx terminal to transmit data to the outside, an Enable terminal to indicate data transmission to the outside, and an Ext. INT terminal to receive an external interrupt.

The communication device 220 may include an A terminal and a B terminal to receive a differential-type signal in the RS-485 communication environment, an RO terminal to output received data, an NRE terminal to control data reception, a DE terminal to control data transmission, and a DI terminal to which data to be transmitted may be input. Further, the communication device 220 may include a receiver buffer 221 to transform a differential-type signal for RS-485 communication into a single ended-type signal recognizable by the microcomputer 210, and a trans-buffer to transform a single ended-type signal output from the microcomputer 210 into a differential-type signal for RS-485 communication.

As exemplarily shown in FIG. 9, the Tx terminal of the microcomputer 210 to transmit data may be connected to the DI terminal of the communication device 220 to which data to be transmitted may be input, and the Enable terminal of the microcomputer 210 to indicate data transmission may be connected to the DE terminal of the communication device 220 to control data transmission. Further, the NRE terminal of the communication device 220 to control data reception may be connected to the ground so as to receive data at all times.

The RO terminal of the communication device 220 to output received data may be connected to the Rx terminal of the microcomputer 210 to receive data and the Ext. INT terminal of the microcomputer 210 to receive an external interrupt. By connecting the RO terminal of the communication device 220 to output received data to the Ext. INT terminal of the microcomputer 210 to receive an external interrupt, a preamble signal transmitted by another constituent unit of the multi-type air conditioning apparatus 100 may be treated as an external interrupt.

Specifically, the microcomputer 210 may treat a preamble signal transmitted by another constituent unit of the multi-type air conditioning apparatus 100 as an external interrupt by activating an external interrupt input to the Ext. INT terminal during the communication request standby time C and the priority set times D1~D5 shown in FIG. 5, and may receive data transmitted by another constituent unit of the multi-type air conditioning apparatus 100 through the Rx terminal by deactivating an external interrupt input to the Ext. INT terminal during the data transmission/reception time A and the data protection time B.

In the microcomputer 210, in order to reduce the number of external terminals, one terminal may perform a plurality of functions. For example, the Tx terminal of the microcomputer 210 may be set in a universal asynchronous receiver/transmitter (UART) communication mode, a universal synchronous receiver/transmitter (USRT) communication mode, or a general purpose input/output (GPIO) communication mode according to communication environments.

If the microcomputer 210 transmits a preamble signal to occupy the communication line 150, the microcomputer 210 may transmit a pulse including two falling edges shown in FIG. 8. At this time, if the Tx terminal may be in the UART or USRT communication mode, the microcomputer 210 may transmit the pulse including two falling edges by changing the communication mode of the Tx terminal to the GPIO communication mode.

Figure 10:
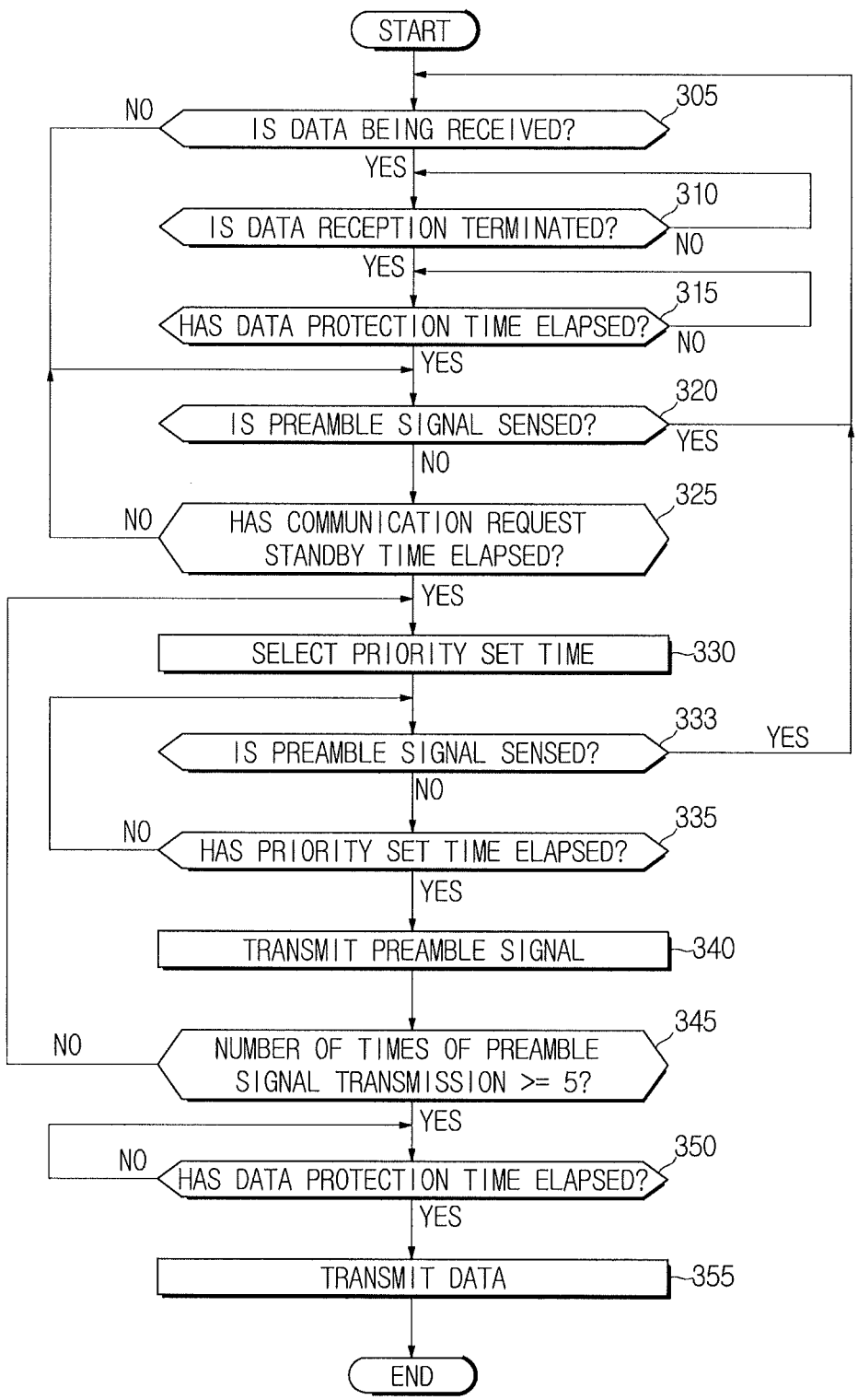
FIG. 10 is a flowchart illustrating the communication method among the constituent units of the multi-type air conditioning apparatus in accordance with one or more embodiments.

FIG. 10 is a flowchart illustrating the communication method among the constituent units of the multi-type air conditioning apparatus in accordance with one or more embodiments.

A constituent unit desiring to perform communication may determine whether or not data is being received through the communication line 150 (Operation 305).

Upon determining that data is being received ("Yes" of Operation 305), the constituent unit desiring to perform communication may determine whether or not data reception is terminated (Operation 310). If data reception is not terminated ("No" of Operation 310), the constituent unit desiring to perform communication may stand by until data reception is terminated.

When data reception has been terminated ("Yes" of Operation 310), the constituent unit desiring to perform communication may determine whether or not a data protection time from termination of data reception has elapsed (Operation 315). Upon determining that the data protection time has not elapsed ("No" of Operation 315), the constituent unit desiring to perform communication may stand by until the data protection time has elapsed.

Upon determining that the data protection time has elapsed ("Yes" of Operation 315), the constituent unit desiring to perform communication may determine whether or not a preamble signal transmitted by another constituent unit is sensed (Operation 320), and may stand by during a communication request standby time (Operation 325).

When a preamble signal transmitted by another constituent unit is sensed ("Yes" of Operation 320) before the communication request standby time has elapsed ("No" of Operation 325), the constituent unit desiring to perform communication may stand by until the latter constituent unit completes data transmission.

When the communication request standby time has elapsed ("Yes" of Operation 325) under the condition that a preamble signal transmitted by another constituent unit is not sensed ("No" of Operation 320), the constituent unit desiring to perform communication may select a priority set time (Operation 330).

Thereafter, the constituent unit desiring to perform communication may determine whether or not a preamble signal transmitted by another constituent unit is sensed (Operation 330), and may stand by during the priority set time.

When a preamble signal transmitted by another constituent unit is sensed ("Yes" of Operation 333) before the priority set time has elapsed ("No" of Operation 335), the constituent unit desiring to perform communication may stand by until the latter constituent unit completes data transmission.

When the priority set time has elapsed ("Yes" of Operation 335) under the condition that a preamble signal transmitted by another constituent unit is not sensed ("No" of Operation 333), the constituent unit may transmit a preamble signal through the communication line 150 (Operation 340).

The constituent unit desiring to perform communication may perform the above-described selection of a priority set time and transmission of a preamble signal until the priority set time has elapsed 5 times (Operation 345).

Thereafter, the constituent desiring to perform communication may determine whether or not a data protection time to protect data which will be transmitted has elapsed (Operation 350), and may stand by during the data protection time.

When the data protection time has elapsed ("Yes" of Operation 350), the constituent desiring to perform communication may transmit data through the communication line 150 (Operation 355).

As is apparent from the above description, in a multi-type air conditioning apparatus and a communication module in accordance with one or more embodiments, a constituent unit of the multi-type air conditioning apparatus may select a priority set time, may transmit a preamble signal after the selected priority set time has elapsed, and may delay data transmission if a preamble signal transmitted by another constituent unit is sensed during the priority set time, thus possibly avoiding collision on a communication line and occupying the communication line.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention have been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A multi-type air conditioning apparatus comprising at least one outdoor unit, a plurality of indoor units, and a communication line connecting the at least one outdoor unit and the plurality of indoor units, wherein each of the at least one outdoor unit and the plurality of indoor units comprises:
   a communicator configured to transmit/receive data through the communication line; and
   a controller configured to randomly select a priority set time, to control the communicator to transmit at least one preamble signal through the communication line when the priority set time has elapsed, and to control the communicator to transmit the data through the communication line when transmission of the at least one preamble signal has been completed.

2. The multi-type air conditioning apparatus according to claim 1, wherein the controller stops transmission of the at least one preamble signal when a preamble signal transmitted from another constituent unit of the multi-type air conditioning apparatus is sensed through the communication line before transmission of the at least one preamble signal has been completed.

3. The multi-type air conditioning apparatus according to claim 2, wherein the at least one preamble signal includes at least two pulses.

4. The multi-type air conditioning apparatus according to claim 2, wherein the controller determines whether or not the communication line is occupied by the other constituent unit.

5. The multi-type air conditioning apparatus according to claim 4, wherein the controller stands by during a standby time so as to determine whether or not the communication line is occupied.

6. The multi-type air conditioning apparatus according to claim 5, wherein the controller determines that the communication line is occupied by the other constituent unit when the preamble signal transmitted from the other constituent unit is sensed during the standby time.

7. The multi-type air conditioning apparatus according to claim 6, wherein the controller receives the preamble signal transmitted from the other constituent unit as an external interrupt.

8. The multi-type air conditioning apparatus according to claim 6, wherein the controller stands by until data transmission of the other constituent unit has been completed, upon determining that the communication line is occupied by the other constituent unit.

9. The multi-type air conditioning apparatus according to claim 2, wherein the communicator transmits/receives the data in a differential communication mode.

10. The multi-type air conditioning apparatus according to claim 2, wherein the communicator transmits/receives the data based on a Recommended Standard (RS)-485 communication regulation.

11. A communication module comprising a plurality of constituent units and a communication line connecting the plurality constituent units, wherein each of the plurality of constituent units comprises:
a communicator configured to transmit/receive data through the communication line; and
a controller configured to randomly select a priority set time, to control the communicator to transmit at least one preamble signal through the communication line when the priority set time has elapsed, and to control the communicator to transmit the data through the communication line when transmission of the at least one preamble signal has been completed.

12. The communication module according to claim 11, wherein the controller stops transmission of the at least one preamble signal when a preamble signal transmitted from another constituent unit of the communication module is sensed through the communication line before transmission of the at least one preamble signal has been completed.

13. The communication module according to claim 12, wherein the at least one preamble signal includes at least two pulses.

14. A control method of a multi-type air conditioning apparatus which has at least one outdoor unit, a plurality of indoor units, and a communication line connecting the at least one outdoor unit and the plurality of indoor units, the control method comprising:
randomly selecting a priority set time;
when the priority set time has elapsed, transmitting through the communication line at least one preamble signal; and
transmitting the data through the communication line, when transmission of the at least one preamble signal has been completed.

15. The control method according to claim 14, further comprising stopping transmission of the at least one preamble signal when a preamble signal transmitted from another constituent unit of the multi-type air conditioning apparatus is sensed through the communication line before transmission of the at least one preamble signal has been completed.

16. The control method according to claim 15, wherein the at least one preamble signal includes at least two pulses.

17. The control method according to claim 15, further comprising determining whether or not the communication line is occupied by the other constituent unit.

18. The control method according to claim 17, wherein the determination as to whether or not the communication line is occupied includes sensing the preamble signal transmitted from the other constituent unit, and determining that the communication line is occupied by the other constituent unit when the preamble signal transmitted from the other constituent unit is sensed.

19. The control method according to claim 18, further comprising standing by until data transmission of the other constituent unit has been completed, upon determining that the communication line is occupied by the other constituent unit.

20. The control method according to claim 15, wherein the data is transmitted/received in a differential communication mode.

21. The control method according to claim 15, wherein the data is transmitted/received based on a Recommended Standard (RS)-485 communication regulation.

22. A multi-type electronic apparatus comprising a plurality of constituent units, wherein each of the constituent units comprises:
a communicator configured to transmit/receive data through a communication line; and
a controller configured to randomly select a priority set time, to control the communicator to transmit at least one preamble signal through the communication line when the priority set time has elapsed, and to control the communicator to transmit the data through the communication line when transmission of the at least one preamble signal has been completed.

23. The multi-type electronic apparatus according to claim 22, wherein the controller stops transmission of the at least one preamble signal when a preamble signal transmitted from another constituent unit is sensed through the communication line before transmission of the at least one preamble signal has been completed.

24. The multi-type electronic apparatus according to claim 23, wherein the controller stands by during a standby time so as to determine whether or not the communication line is occupied.

25. The multi-type electronic apparatus according to claim 24, wherein when urgent communication is required the controller stands by during an urgent standby time that is shorter than the standby time.

26. The multi-type electronic apparatus according to claim 24, wherein the controller determines that the communication line is occupied by the other constituent unit when the preamble signal transmitted from the other constituent unit is sensed during the standby time.

* * * * *